United States Patent [19]
Asano et al.

[11] Patent Number: 6,044,095
[45] Date of Patent: Mar. 28, 2000

[54] LIGHT EMITTING DEVICE DRIVE CIRCUIT

[75] Inventors: Hiroaki Asano, Katano; Susumu Morikura, Yawata, both of Japan

[73] Assignee: Matsushita Electric Industrial Co., Ltd., Osaka-fu, Japan

[21] Appl. No.: 08/959,298

[22] Filed: Oct. 28, 1997

[30] Foreign Application Priority Data

Oct. 30, 1996 [JP] Japan .................................... 8-287859

[51] Int. Cl.[7] ...................................................... H01S 3/13
[52] U.S. Cl. ................................. 372/31; 372/29; 372/38
[58] Field of Search ............................... 372/38, 29, 31, 372/34, 25

[56] References Cited

U.S. PATENT DOCUMENTS

| 5,563,898 | 10/1996 | Ikeuchi et al. | 372/38 |
| 5,666,045 | 9/1997 | Grodevant | 372/38 |

FOREIGN PATENT DOCUMENTS

| 58-222580 | 12/1983 | Japan | 372/38 |
| 7-154016 | 6/1995 | Japan . | |
| 9-64441 | 3/1997 | Japan . | |

OTHER PUBLICATIONS

Semiconductor Devices for Optical Communication (Spring–Verlag Publishing) pp. 182–185 (Jun. 1982).

*Primary Examiner*—James W. Davie
*Attorney, Agent, or Firm*—Wenderoth, Lind & Ponack, L.L.P.

[57] ABSTRACT

A laser diode 11 performs switching operation with a high speed in response to a digital-modulated electric signal inputted in differential input terminals 10a and 10b. At this time, a voltage detecting portion 14 detects a terminal voltage of the laser diode 11. A peak detecting portion 15 detects a peak value of output of the voltage detecting portion 14. A current control portion 16 controls a drive current of the laser diode 11 in accordance with an output of the peak detecting portion 15. The current control portion 16 includes a reference voltage generating portion 16a generating a reference voltage, and an error detecting portion 16b detecting an error between the reference voltage generated by the reference voltage generating portion 16a and the output of the peak detecting portion 15. In accordance with an output signal of the error detecting portion 16b, the drive current of the laser diode 11 is controlled. In this way, it is possible to stabilize light output of the laser diode 11 without using a photodiode for monitoring, and thereby to obtain a light emitting device drive circuit with high reliability at low costs. Further, since the current control portion 16 is divided into the reference voltage generating portion and the error detecting portion, only the reference voltage generating portion 16a is required to be changed when a light emitting device of a different type is used. Further, the reference voltage generating portion 16a generates a reference voltage which follows changes of the terminal voltage of the laser diode 11 with respect to temperature changes under the conditions that light output of the laser diode 11 is kept constant, and thereby it is possible to obtain constant light output in a wide range of temperatures.

8 Claims, 17 Drawing Sheets

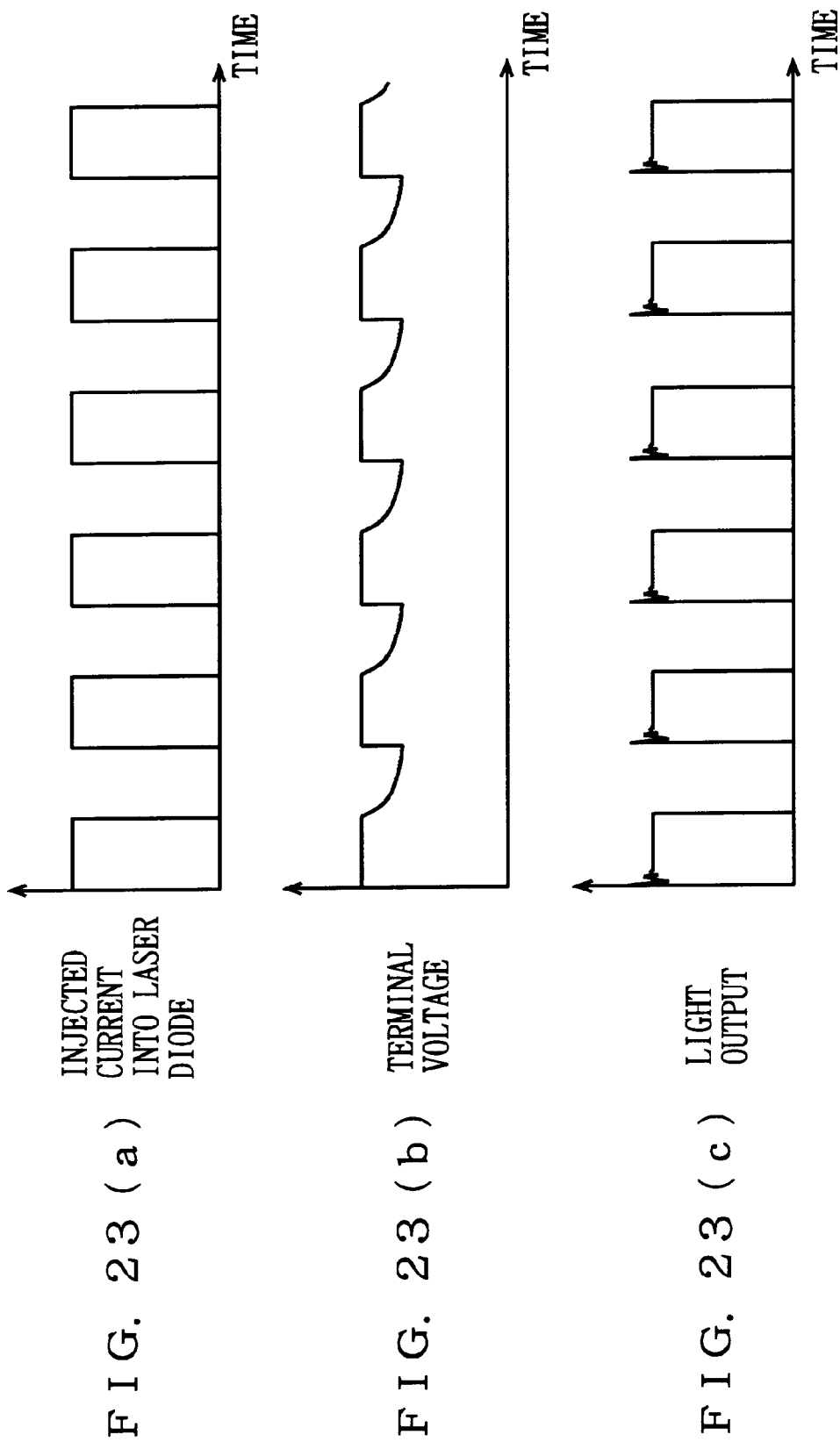

LIGHT EMITTING DEVICE DRIVE CIRCUIT

BACKGROUND OF THE INVENTION

1. Field of the Invention

The present invention relates to light emitting device drive circuits, and more specifically, to a drive circuit of light emitting devices for use in optical communications with a digital modulation method and a drive circuit for stabilizing light output particularly in the presence of temperature changes, etc.

2. Description of the Background Art

As light emitting devices for use in optical communications, laser diodes and LEDs are generally considered. A direct modulation method of extracting light output in accordance with the amount of current to be injected using these devices has been widely used because it can be easily realized at relatively low costs.

However, these light emitting devices have a characteristic that light output changes with respect to temperature changes. This is especially the case in a laser diode since both of its threshold current and slope efficiency (light emitting efficiency) generally have a temperature change characteristic. Therefore, in the presence of temperature changes, a method for stabilizing light output is generally adapted in order to make light output constant. For example, in a laser diode drive circuit described in Semiconductor Devices for optical communication (Springer-Verlag publishing) p. 184, and a laser diode drive circuit described in Japanese Patent Laid-Open No. 9-64441, in order to hold light output constant, a photodiode for monitoring light output is provided on the back of the laser diode, and on the basis of the output current of the photodiode, feedback control so as to always make light output constant. That is, in these drive circuits, a bias current of the laser diode is feedback-controlled based on a mean value of output of the photodiode for monitoring.

In recent years, as a method for optical communications, the number of cases where a burst signal is handled has increased. However, in the burst signal, its mark rate (the average rate at which the same logic appears) is not constant, and thereby it is impossible to keep light output constant in a method of controlling the bias current by the mean value of output of the photodiode for monitoring. Thus, it is necessary to detect a peak value of output of the photodiode for monitoring. In order to detect the peak value, a relatively high-speed photodiode is required. In the high-speed photodiode, its light receiving area is relatively small, and therefore, in a step of installing the photodiode on the back of the laser diode as a module, it is generally required to align the optical axis, thereby disadvantageously increasing costs of the module and limiting a reduction of the size of the module.

Furthermore, when handling the burst signal during a no signal period, the current consumed in the drive circuit is preferably minimized. In order to achieve this, suggested is a high speed APC circuit described in Japanese Patent Laid-Open No. 7-154016. In the high speed APC circuit, adapted is a method of switching the current injected into the laser diode using an emitter-coupled type circuit. That is, this high speed APC circuit uses an analog switch which is connected to a base of a transistor for use as a current source connected to the emitter-coupled type circuit, and is constructed so as to control the current source based on a current signal from the photodiode for monitoring during a period where a signal exists and to change the analog switch to set base-emitter voltage of the transistor for use as the source to 0 during a no-signal period of the burst signal, thereby minimizing the current consumption.

However, in general, it is difficult to operate the analog switch at a high speed because its response rate is limited. Therefore, in the structure such as that of the above high-speed APC circuit, it is difficult to operate the light emitting device drive circuit accurately from the first bit of the burst signal immediately after switching.

SUMMARY OF THE INVENTION

An object of the present invention is to provide a light emitting device drive circuit capable of stabilizing changes of light output of a light emitting device due to temperature changes.

In order to achieve the above object, the present invention has the following characteristics.

A first aspect of the present invention is directed to a light emitting device drive circuit for stably driving a light emitting device which performs switching operation in response to a digital-modulated electric signal, comprising:

a voltage detecting portion for detecting terminal voltage of the light emitting device, a peak detecting portion for detecting a peak value of output of the voltage detecting portion, and a current control portion for controlling a drive current of the light emitting device in accordance with output of the peak detecting portion.

In accordance with the first aspect, light output can be stabilized without using a photodiode for monitoring, and thereby it is possible to obtain a highly reliable light emitting device drive circuit at low costs.

According to a second aspect of the present invention, in the first aspect, the current control portion includes:

a reference voltage generating portion for generating a reference voltage, and an error detecting portion for detecting an error between the reference voltage generated by the reference voltage generating portion and output of the peak detecting portion, and the drive current of the light emitting device is controlled in accordance with an output signal of the error detecting portion.

In accordance with the second aspect, the current control portion is divided into the reference voltage generating portion and the error detecting portion, and thereby it is possible to obtain an advantage that only a change of the reference voltage generating portion is required to use a light emitting device of a different type.

According to a third aspect of the present invention, in the second aspect, the reference voltage generating portion generates a reference voltage which follows changes of the terminal voltage of the light emitting device with respect to temperature changes under conditions that light output of the light emitting device is kept constant.

In accordance with the third aspect, the reference voltage generating portion generates a reference voltage which follows changes of the terminal voltage of the light emitting device with respect to temperature changes, and thereby it is possible to obtain constant light output in a wide range of temperatures.

According to a fourth aspect of the present invention, in the third aspect, the reference voltage generating portion includes a plurality of reference voltage generating sources for respectively generating a reference voltage which follows changes of the terminal voltage of the light emitting device with respect to temperature changes in a unique temperature range, and switches to output the reference voltage generated by each of the reference voltage generating sources in accordance with ambient temperature changes.

In accordance with the fourth aspect, the reference generating portion comprises a plurality of reference voltage generating sources, switching to output reference voltage generated by each of the reference voltage generating sources in accordance with changes of ambient temperature, and thereby it is flexibly adaptable even if a trend of the terminal voltage characteristic for obtaining constant light output changes with temperature ranges.

According to a fifth aspect of the present invention, in the second aspect, the current control portion further includes a current bypass portion for bypassing a portion of drive current of the light emitting device to decrease the drive current.

In accordance with the fifth aspect, a current bypass portion is provided for the current control portion, allowing a reduction of power consumption.

According to a sixth aspect of the present invention, in the fifth aspect, the digital-modulated electric signal is inputted in a form of a burst signal, a control signal is provided for notifying the presence or absence of the burst signal, and the current bypass portion decreases the drive current of the light emitting device by bypassing the drive current when notified by the control signal of the absence of the burst signal.

In accordance with the sixth aspect, the current bypass portion operates in response to the control signal notifying the presence or absence of the burst signal, thereby allowing a reduction of power consumption only during a no-signal period of the burst signal.

According to a seventh aspect of the present invention, in the first aspect, the digital-modulated electric signal is inputted in a form of a burst signal, and a charge time constant of the peak detecting portion is set within the first several bit period of the burst signal.

In accordance with the seventh aspect, the charge time constant of the peak detecting portion is set to be approximately the number of bits of the preamble signal, and thereby stabilization of light output at the time of start communications after a long halt is performed during a preamble period.

According to an eighth aspect of the present invention, in the seventh aspect, a discharge time constant of the peak detecting portion is set to be a value sufficiently larger than a no-signal period of the burst signal.

In accordance with the eighth aspect, the discharge time constant of the peak detecting portion is set to be sufficiently large compared to a period of the burst signal, and thereby it is possible to obtain stable light output from the head bit for the burst signal after a second period once communications start and the burst signal is periodically transmitted.

A ninth aspect of the present invention is directed to a light emitting device drive circuit for steadily driving a light emitting device which performs switching operations in response to a digital-modulated electric signal, comprising:

a voltage detecting portion for detecting terminal voltage of the light emitting device, a mean value detecting portion for detecting a mean value of output of the voltage detecting portion, and a current control portion for controlling drive current of the light emitting device in accordance with output of the mean value detecting portion.

In accordance with the ninth aspect, light output can be stabilized without using a photodiode for monitoring, and thereby it is possible to obtain a highly reliable light emitting device drive circuit at low costs.

According to a tenth aspect of the present invention, in the ninth aspect, the current control portion includes:

a reference voltage generating portion for generating a reference voltage, and an error detecting portion for detecting an error between the reference voltage generated by the reference voltage generating portion and the output of the mean value detecting portion, and controls the drive current of the light emitting device in accordance with an output signal of the error detecting portion.

In accordance with the tenth aspect, the current control portion is divided into the reference voltage generating portion and the error detecting portion, and thereby it is possible to obtain an advantage that only a change of the reference voltage generating portion is required to use a light emitting device of a different type.

According to an eleventh aspect of the present invention, in the tenth aspect, the reference voltage generating portion generates a reference voltage which follows changes of the terminal voltage of the light emitting device with respect to temperature changes under conditions that light output of the light emitting device is kept constant.

In accordance with the eleventh aspect, the reference voltage generating portion generates a reference voltage which follows changes of the terminal voltage of the light emitting device with respect to temperature changes, and thereby it is possible to obtain constant light output in a wide range of temperatures.

According to a twelfth aspect of the present invention, in the eleventh aspect, the reference voltage generating portion includes a plurality of reference voltage generating sources for respectively generating reference voltage which follows changes of the terminal voltage of the light emitting device with respect to temperature changes in a unique temperature range, and switches to output the reference voltage generated by each of the reference voltage generating sources.

In accordance with the twelfth aspect, the reference generating portion comprises a plurality of reference voltage generating sources, switching to output reference voltage generated by each of the reference voltage generating sources in accordance with changes of ambient temperature, and thereby it is flexibly adaptable even if a trend of the terminal voltage characteristic for obtaining constant light output changes with temperature ranges.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 23(*a*) to 23(*c*) are diagrams showing input/output waveforms of the laser diode when the digital-modulated current signal is injected into the laser diode.

DESCRIPTION OF THE PREFERRED EMBODIMENTS (First Embodiment)

Figure 1:
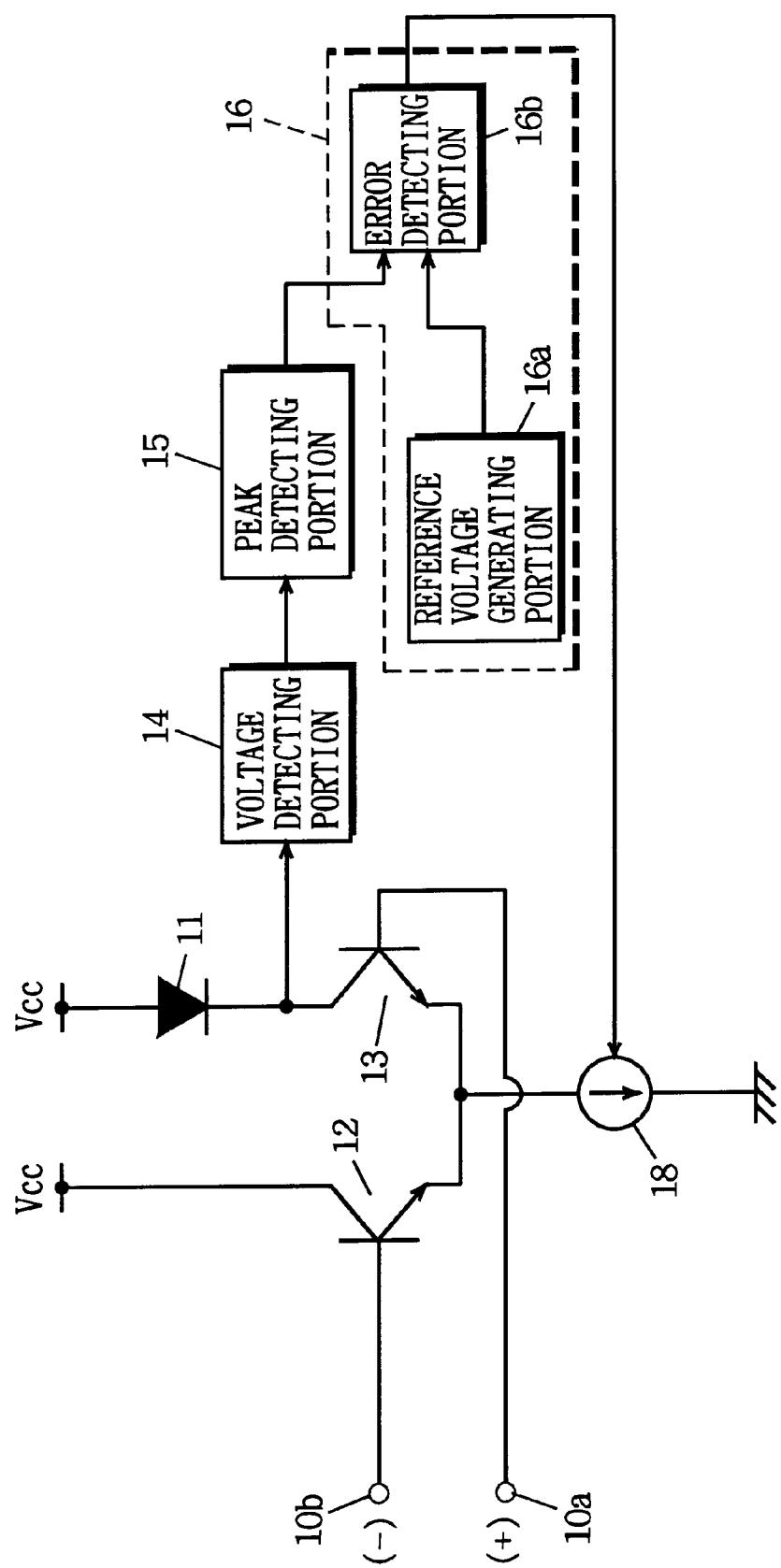
FIG. 1 is a circuit block diagram showing the structure of a light emitting device drive circuit according to a first embodiment of the present invention.

FIG. 1 is a circuit block diagram showing the structure of a light emitting device drive circuit according to a first embodiment of the present invention. In FIG. 1, inputted into differential input terminals 10*a* and 10*b* are electric signals which are digital-modulated and whose polarities are opposite each other. That is, an electric signal with positive polarity and an electric signal with negative polarity are inputted to the differential input terminal 10*a* and the differential input terminal 10*b*, respectively. The electric signals inputted to the differential input terminals 10*a* and 10*b* are respectively provided for bases of transistors for switching 13 and 12. Emitters of these transistors for switching 12 and 13 are connected in common to be grounded through a variable current source 18 with a control terminal. A collector of the transistor for switching 12 is directly connected to a power supply line. A collector of the transistor for switching 13 is connected through a laser diode 11, which is an example of light emitting devices, to the power supply line. For the laser diode 11, its anode side is connected to the power supply line and its cathode side is connected to the collector of the transistor for switching 13.

The cathode of the laser diode 11 is also connected to a voltage detecting portion 14 for detecting terminal voltage of the laser diode 11. Output of the voltage detecting portion 14 is provided for a peak detecting portion 15, which detects its peak value. Output of the peak detecting portion 15 is provided for one input terminal of an error detecting portion 16*b*. Provided for the other input terminal of the error detecting portion 16*b* is a reference voltage produced by a reference voltage generating portion 16*a*. The error detecting portion 16*b* detects and then outputs an error between output of the peak detecting portion 15 and output of the reference voltage generating portion 16*a*. Output of the error detecting portion 16*b* is provided for the control terminal of the variable current source 18. That is, the reference voltage generating portion 16*a* and the error detecting portion 16*b* forms a current control portion 16 for controlling a set current of the variable current source 18 based on an output of the peak detecting portion 15.

Figure 2:
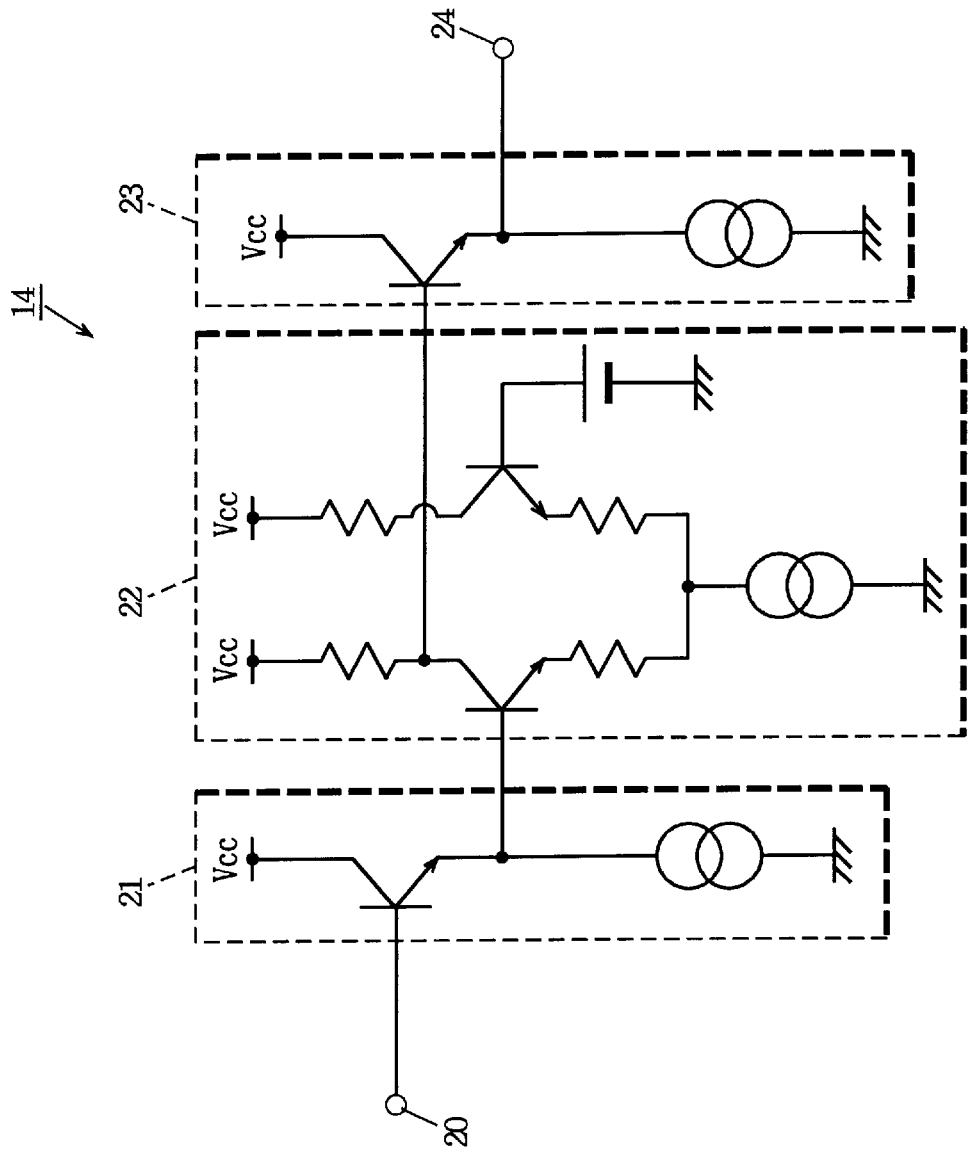
FIG. 2 is a circuit diagram showing an example of internal structure of a voltage detecting portion shown in FIG. 1.

FIG. 2 is a circuit diagram showing an example of internal structure of the voltage detecting portion 14 shown in FIG. 1. In FIG. 2, the voltage detecting portion 14 includes an input terminal 20 to which the cathode of the laser diode 11 is connected, an emitter follower 21 to which the input terminal 20 is connected, a differential amplifier 22 receiving an output of the emitter follower 21, an emitter follower 23 receiving an output of the differential amplifier 22, and an output terminal 24 receiving an output of the emitter follower 23.

Figure 3:
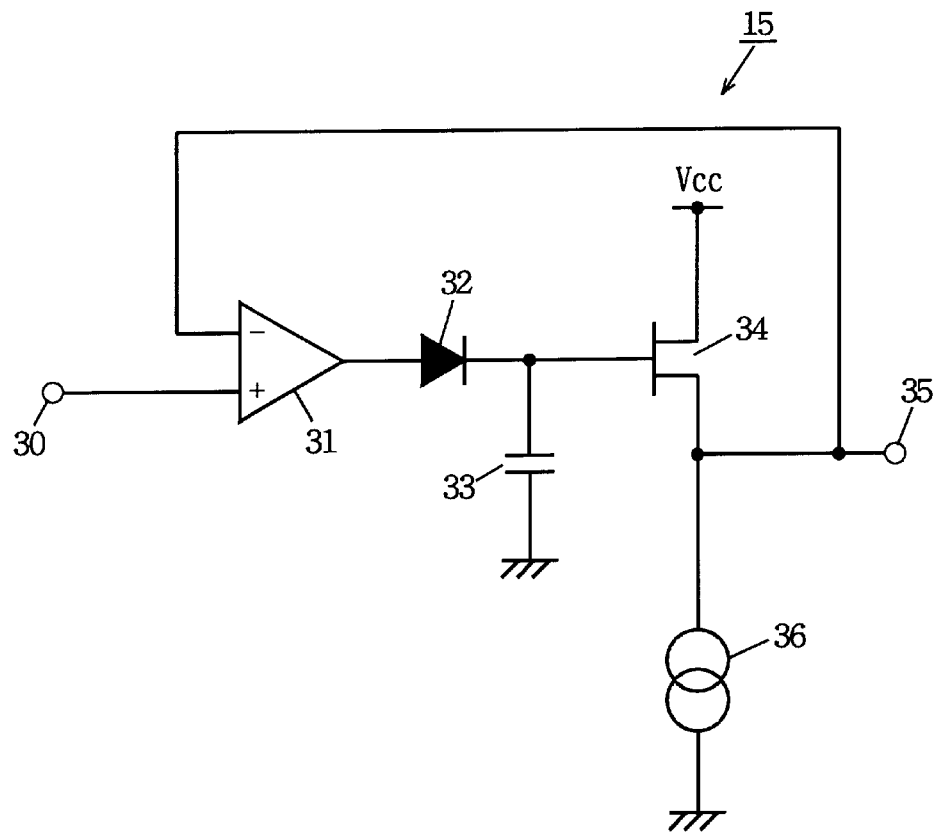
FIG. 3 is a circuit diagram showing an example of internal structure of a peak detecting portion shown in FIG. 1.

FIG. 3 is a circuit diagram showing an example of an internal structure of the peak detecting portion 15 shown in FIG. 1. In FIG. 3, the peak detecting portion 15 includes an input terminal 30, an operational amplifier 31, a diode 32, capacitor 33, a field-effect transistor 34, an output terminal 35, and a constant current source 36. Provided for the input terminal 30 is an output of the voltage detecting portion 14. Input from the input terminal 30 is provided for the positive side of an input terminal of the operational amplifier 31. An output of the operational amplifier 31 is provided through the diode 32 connected in the forward direction for one electrode of the capacitor 33 and is also provided for a gate of the field-effect transistor 34. The capacitor 33, the other electrode of which is grounded, forms a peak value holding circuit. The field-effect transistor 34, collaborating with the constant current source 36, forms a source follower. Output of this source follower is provided for the negative side of the input terminal of the operational amplifier 31 and is also provided for the output terminal 35.

Figure 4:
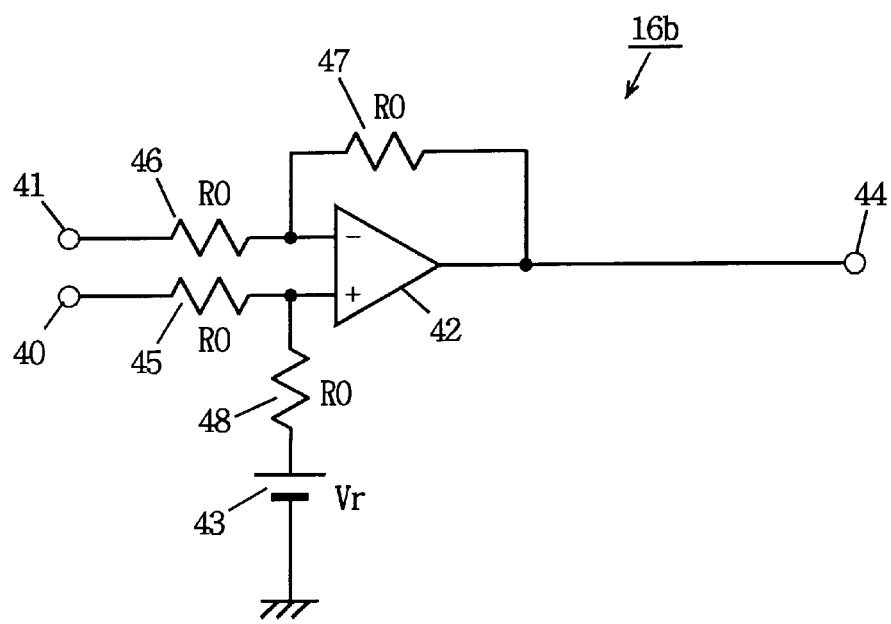
FIG. 4 is a circuit diagram showing an example of internal structure of an error detecting portion shown in FIG. 1.

FIG. 4 is a circuit diagram showing an example of an internal structure of the error detecting portion 16b shown in FIG. 1. In FIG. 4 provided for an input terminal 40 is an output of the reference voltage generating portion 16a, and provided for an input terminal 41 is an output of the peak detecting portion 15. Input from the input terminal 40 is provided through a resistor 45 for the positive side of an input terminal of an operational amplifier 42, and input from the input terminal 41 is provided through a resistor 46 for the negative side of the input terminal of the operational amplifier 42. Further, applied to the positive side of the input terminal of the operational amplifier 42 is an offset voltage through a resistor 48 from a voltage source 43. An output of the operational amplifier 42 is provided for an output terminal 44 and is also feedback through a feedback resistor 47 to the negative side of the input terminal of the operational amplifier 42.

Figure 5:
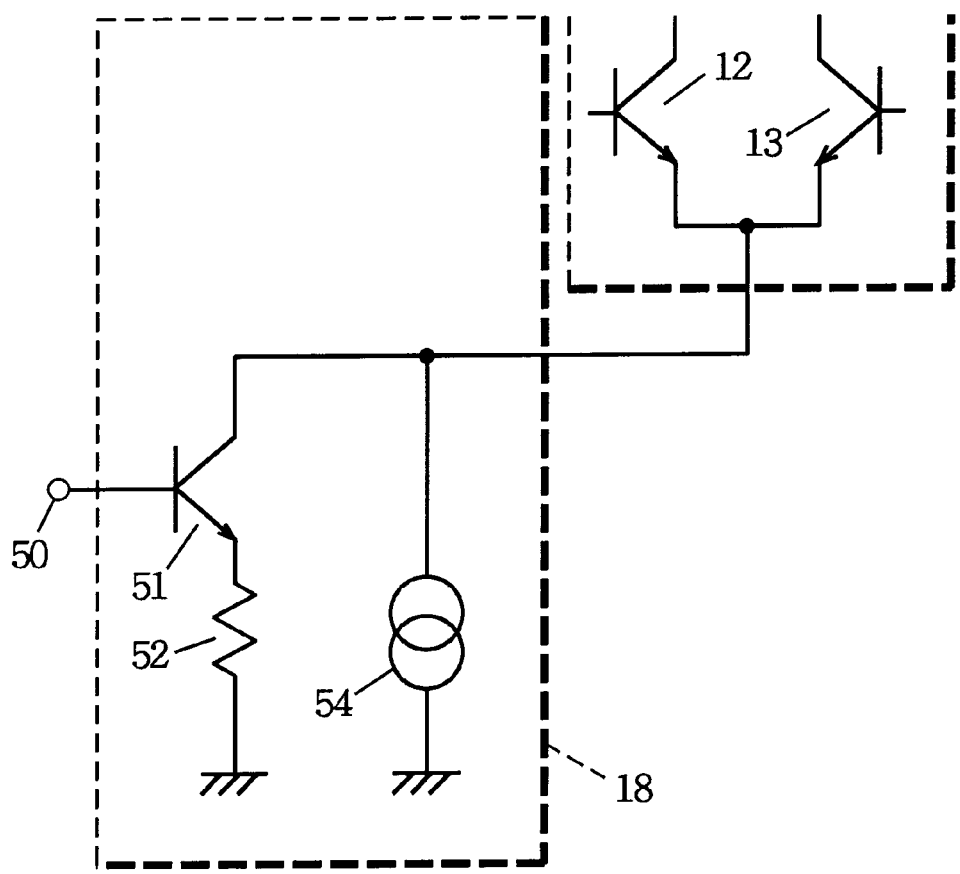
FIG. 5 is a circuit diagram showing an example of internal structure of a variable current source shown in FIG. 1.

FIG. 5 is a circuit diagram showing an example of an internal structure of the variable current source 18 shown in FIG. 1. In FIG. 5, the variable current source 18 includes a control input terminal 50, a transistor 51, a load resistor 52, and a constant current source 54. Provided for the control input terminal 50 is an output of the error detecting portion 16b as a control voltage. The control input terminal 50 is connected to a base of the transistor 51. An emitter of the transistor 51 is grounded through the load resistor 52. A collector of the transistor 51 is connected to a common connecting point of each emitter of the transistors 12 and 13. Further, connected to the collector of the transistor 51 is the constant current source 54. In this structure, the transistor 51 forms a variable current source for extracting a current in proportion to the control voltage applied to its base. Such a variable current source is parallel-connected to the constant current source 54, thereby controlling the amount of current flowing in the transistor 13, that is, the laser diode 11 according to the control voltage.

Figure 6:
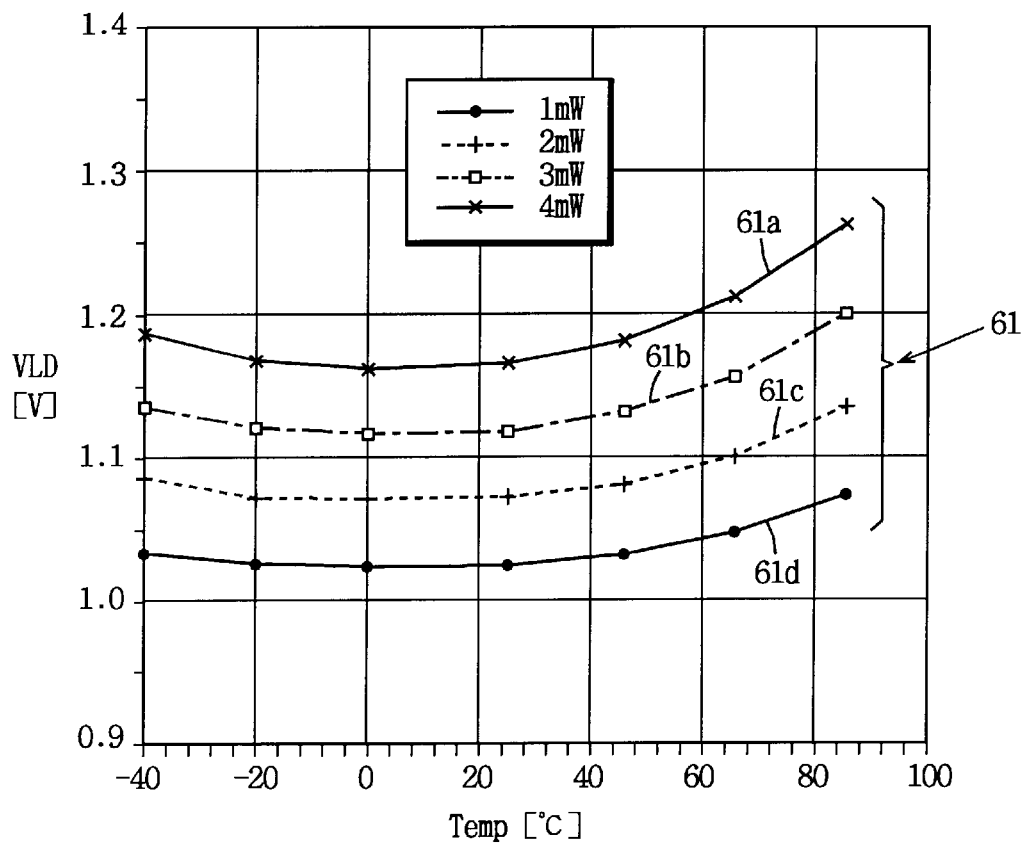
FIG. 6 is a diagram where cathode-anode terminal voltages of a laser diode with respect to ambient temperature with light output of the laser diode constant are measured and plotted.

FIG. 6 is a diagram where cathode-anode terminal voltages of the laser diode 11 with respect to ambient temperature with light output of the laser diode 11 constant are measured and plotted. In FIG. 6, characteristic curves 61a, 61b, 61c, and 61d show characteristics of the terminal voltage with respect to temperature changes when outputs of the laser diode 11 extracted by an optical fiber are constantly 1 mW, 2 mW, 3 mW, and 4 mW, respectively. Here, where the terminal voltage of the laser diode 11 is VLD and a current is ILD, the relation in the following equation (1) is held.

$$VLD \cong (Eg/e) + ILD \cdot Rs \qquad (1)$$

In the above equation (1), Eg is a band gap energy, Rs is an internal resistance value in the forward direction, and e is an amount of electron charge.

When temperature changes, the band gap energy inside the laser diode 11 increases as temperature lowers. Therefore, as shown in FIG. 6, the terminal voltage of the laser diode 11 in the low temperature range tends to slightly increase. On the other hand, in the high temperature range, since the amount of current required for making light output constant increases, a potential drop by the internal resistance Rs of the laser diode 11 increases. The terminal voltage of the laser diode 11 thereby tends to increase. By these effects, the over all temperature ranges, shown in FIG. 6 occur.

Figure 7:
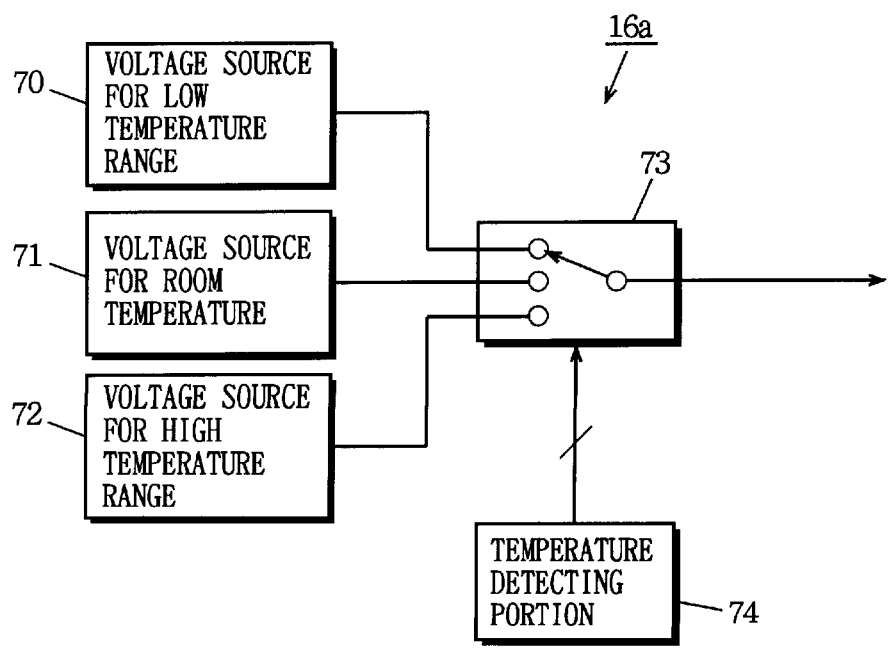
FIG. 7 is a block diagram showing an example of structure of a reference voltage generating portion shown in FIG. 1.

FIG. 7 is a block diagram showing an example of structure of the reference voltage generating portion 16a shown in FIG. 1. In FIG. 7, the reference voltage generating portion 16a includes a voltage source for the low temperature range 70, a voltage source for room temperature 71, a voltage source for the high temperature range 72, an analog switch 73, and a temperature detecting portion 74. The analog switch 73 selectively changes to output a reference voltage generated by the voltage source for the low temperature range 70, the voltage source for room temperature 71, and the voltage source for the high temperature range 72. The temperature detecting portion 74 detects an ambient temperature. The analog switch 73 selectively changes outputs of the voltage source for the low temperature range 70, the voltage source for room temperature 71, and the voltage source for the high temperature range 72 according to the temperature range detected by the temperature detecting portion 74.

Figure 8:
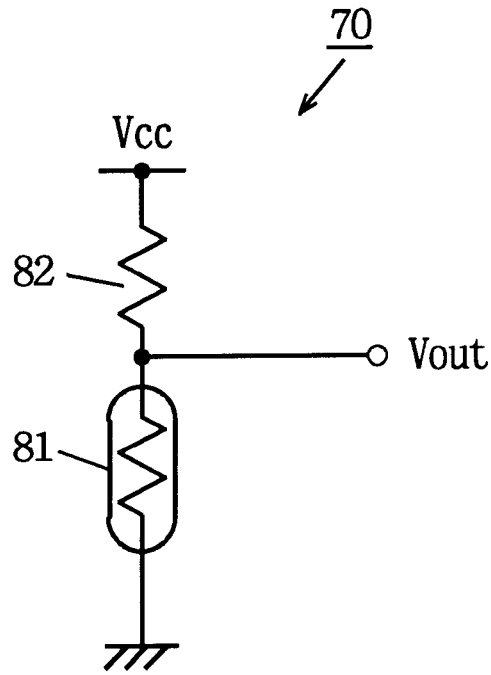
FIG. 8 is a circuit diagram showing an example of structure of a voltage source for the low temperature range shown in FIG. 7.

FIG. 8 is a circuit diagram showing an example of structure of the voltage source for the low temperature range 70 shown in FIG. 7. In FIG. 8, the voltage source for the low temperature range 70 is formed of a voltage dividing circuit with a thermistor 81 and a resistor 82 which are serial-connected.

Figure 9:
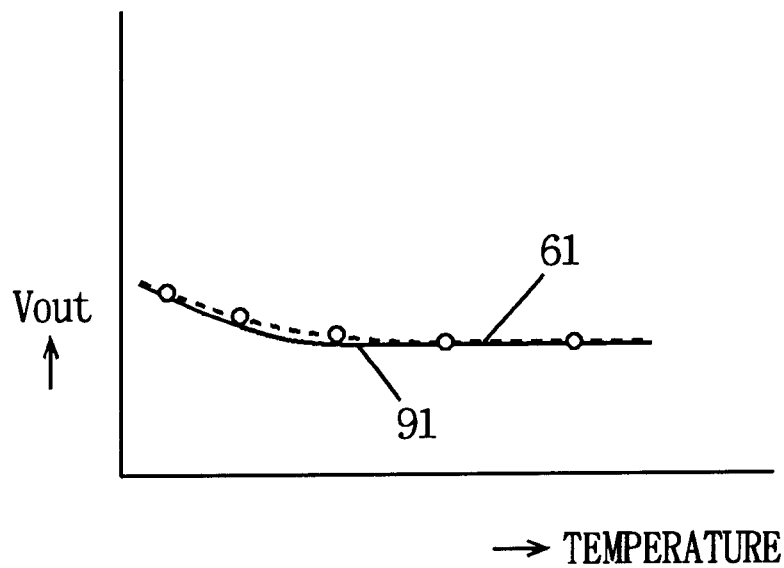
FIG. 9 shows an output voltage characteristic of the voltage source for the low temperature range shown in FIG. 8.

FIG. 9 shows an output voltage characteristic of the voltage source for the low temperature range 70 shown in FIG. 8. In FIG. 9, a characteristic curve 91 shows the output characteristic of the voltage source for the low temperature range 70 with respect to temperature changes in the low temperature range. In FIG. 9, the characteristic 61 of the terminal voltage in the low temperature range with light output of the laser diode 11 to be controlled constant (refer to FIG. 6) is also shown.

Figure 10:
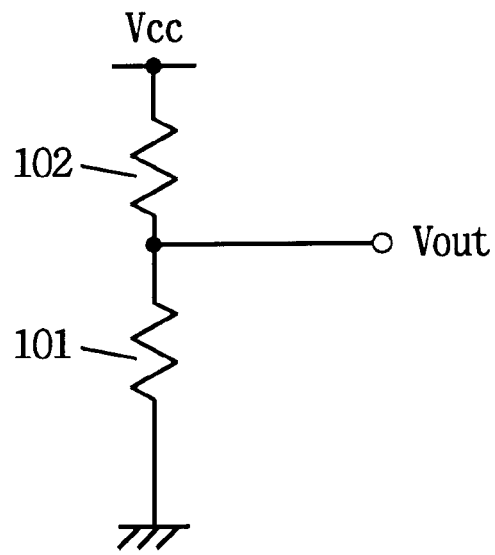
FIG. 10 is a circuit diagram showing an example of structure of a voltage source for room temperature shown in FIG. 7.

FIG. 10 is a circuit diagram showing an example of structure of the voltage source for room temperature 71 shown in FIG. 7. In FIG. 10, the voltage source for room temperature 71 is formed of a voltage dividing circuit with a resistor 101 and a resistor 102 which are serial-connected.

Figure 11:
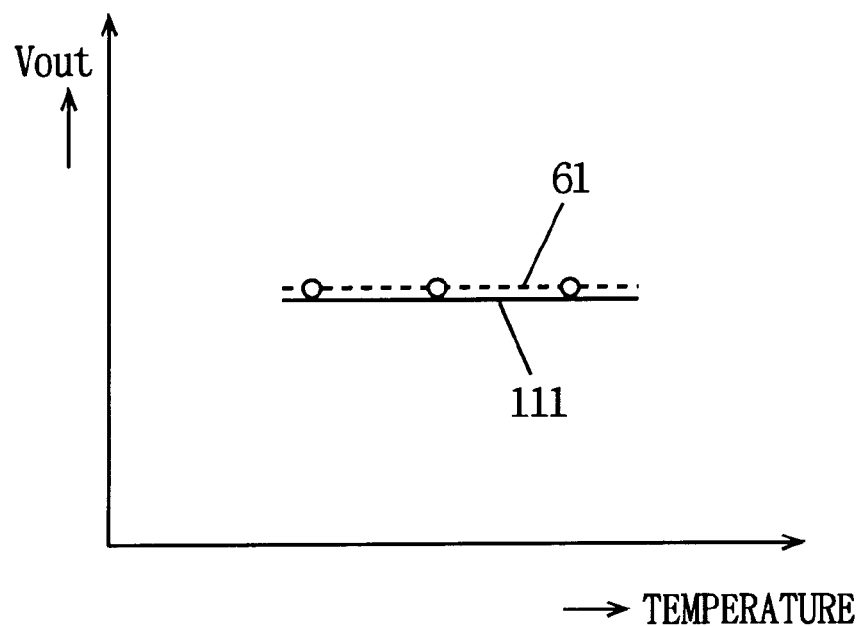
FIG. 11 shows an output voltage characteristic of the voltage source for room temperature shown in FIG. 10.

FIG. 11 shows an output voltage characteristic of the voltage source for room temperature shown in FIG. 10. In FIG. 11, a characteristic curve 111 shows the output characteristic of the voltage source for room temperature 71 with respect to temperature changes in room temperature. In FIG. 11, the characteristic 61 of the terminal voltage in room temperature with light output of the laser diode 11 to be controlled constant (refer to FIG. 6) is also shown.

Figure 12:
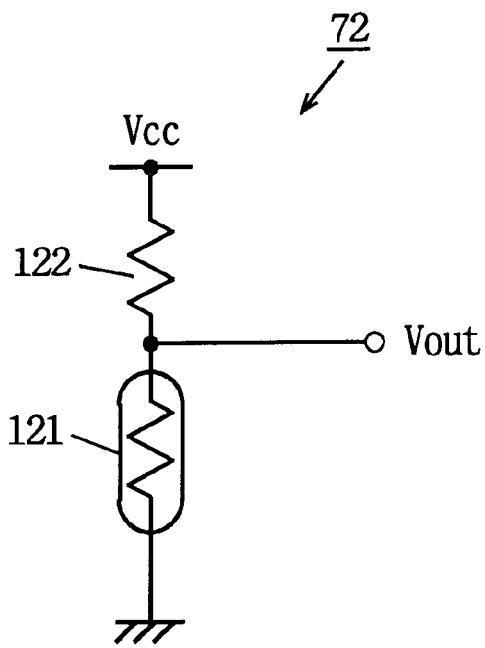
FIG. 12 is a circuit diagram showing an example of structure of a voltage source for the high temperature range shown in FIG. 7.

FIG. 12 is a circuit diagram showing an example of structure of the voltage source for the high temperature range 72 shown in FIG. 7. In FIG. 12, the voltage source for the high temperature range 72 is formed of a voltage dividing circuit with a positive characteristic thermistor 121 and a resistor 122 which are serial-connected.

Figure 13:
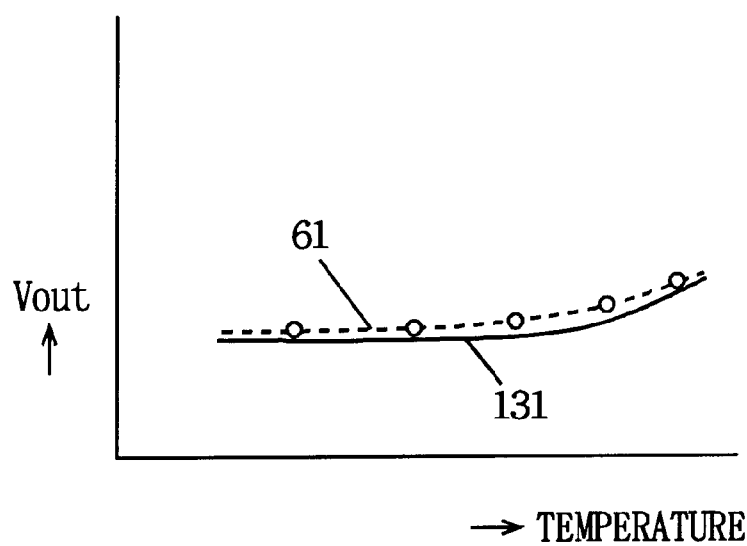
FIG. 13 shows an output voltage characteristic of the voltage source for the high temperature range shown in FIG. 12.

FIG. 13 shows an output voltage characteristic of the voltage source for the high temperature range 72 shown in FIG. 12. In FIG. 13, a characteristic curve 131 shows the output characteristic of the voltage source for the high temperature range 72 with respect to temperature changes in the high temperature range. In FIG. 13, the characteristic 61 of the terminal voltage in the high temperature with light output of the laser diode 11 to be controlled constant (refer to FIG. 6) is also shown.

Figure 14:
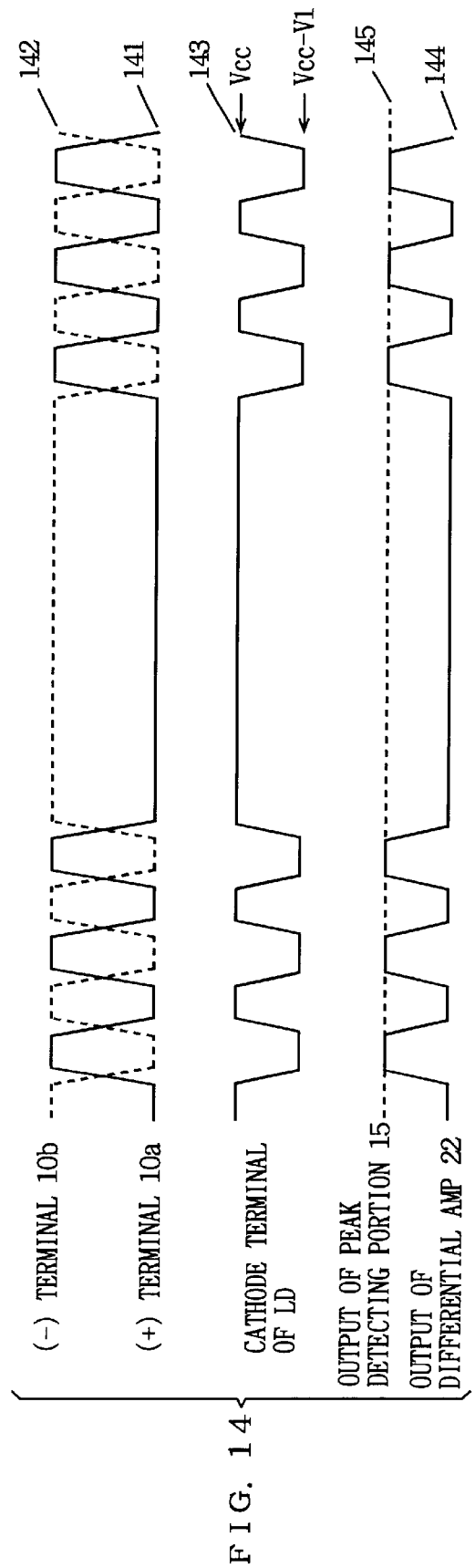
FIG. 14 is a diagram showing voltage waveforms of each portion of the light emitting device drive circuit shown in FIG. 1.

FIG. 14 is a diagram showing voltage waveforms of each portion of the light emitting device drive circuit shown in FIG. 1. In FIG. 14, waveforms 141 and 142 show input voltage waveforms of the differential input terminals 10a and 10b, respectively. Further, a waveform 143 shows potential changes in the cathode terminal of the laser diode 11. Further, a waveform 144 shows an output waveform of the differential amplifier 22 (refer to FIG. 2) in the voltage detecting portion 14. Further, a waveform 145 shows output of the peak detecting portion 15.

Figure 15:
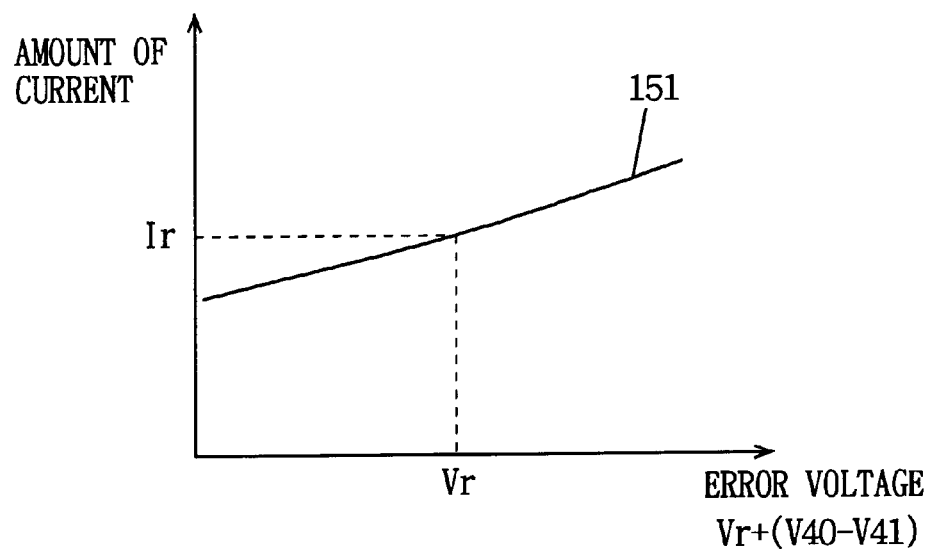
FIG. 15 is a graph showing a change characteristic of a set current value of the variable current source with respect to a error voltage outputted from the error detecting portion.

FIG. 15 is a graph showing a change characteristic of a set current value of the variable current source 18 with respect to error voltage outputted from the error detecting portion 16b. In FIG. 15, a characteristic line 151 shows the change characteristic of the current value set by the variable current source 18. In the characteristic line 151, when the error voltage is Vr, the current value to be set is taken as Ir. In this graph, the error voltage set in the horizontal axis is shown in the following equation (2), where output voltage of the reference voltage generating portion 16a which is applied to the input terminal 40, output voltage of the peak detecting portion 15 which is applied to the input terminal 41, and offset voltage in side the error detecting portion 16b are respectively taken as V40, V41, and Vr.

$$(V40-V41)+Vr \qquad (2)$$

Figure 16:
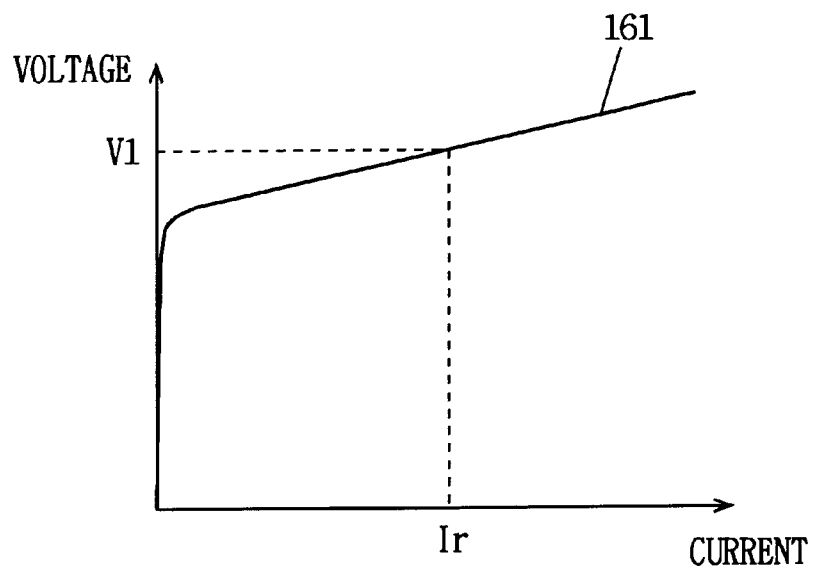
FIG. 16 is a graph showing a change characteristic of a terminal voltage with respect to an injected current of the laser diode.

FIG. 16 is a graph showing a change characteristic of a terminal voltage with respect to an injected current of the laser diode 11. In FIG. 16, a characteristic line 161 shows the change characteristic of the terminal voltage of the laser diode 11. In the characteristic line 161, when the injected current is taken as Ir, the terminal voltage V1 occurs.

Operation of the first embodiment will be described below.

First, consider that in a state that burst signals which intermittently occur are inputted to the differential input terminals 10a and 10b, an output of the reference voltage generating portion 16a is adjusted so that the output voltage 145 of the peak detecting portion 15 is equal to the output voltage of the reference voltage generating portion 16a. In this case, by the change characteristic of the set current value with respect to the error voltage shown in the characteristic line 151, a current shown as the current value Ir flows in the variable current source 18. In this case, when a signal applied to the differential input terminal 10a is at a high level with respect to a signal applied to the differential input terminal 10b, the transistor for switching 12 becomes in the off state and the transistor 13 becomes in the on state. Therefore, the current set in the variable current source 18 flows in the laser diode 11, and thereby the laser diode 11 emits light. On the other hand, when a signal applied to the differential input terminal 10a is at a low level with respect to a signal applied to the differential input terminal 10b, the transistor for switching 12 becomes in the on state and the transistor 13 becomes in the off state. Therefore, a current does not flow in the laser diode 11, and thereby the light of the laser diode 11 goes out.

When the current with the current value Ir flows in the laser diode 11, the terminal voltage V1 is generated between terminals of the laser diode 11 as shown in the characteristic line 161. When a source voltage level is taken as Vcc, voltage of the cathode terminal of the laser diode 11 is (Vcc−V1) as shown in the waveform 143. This voltage is transmitted by the emitter follower 21 to the differential amplifier 22 in the next stage. The output waveform of the differential amplifier 22 becomes a pulse waveform with phases reversed as shown in the waveform 144. Output of the peak detecting portion 15 detects and then holds a maximum value of output of the differential amplifier 22 as shown in the waveform 145.

Next, consider a case that the drive current of the laser diode 11 decreases due to changes in the power voltage, for example. In this case, as seen from the current voltage characteristic of the laser diode 11 shown in the characteristic line 161, when the drive current of the laser diode 11 decreases from the current value Ir, its terminal voltage also decreases from the voltage value V1. In response, the peak value of output of the differential amplifier 22 becomes small. As a result, the output of the peak detecting portion 15 takes a lower voltage value than its initial one. In this case, the output of the peak detecting portion 15 is less than the output of the reference voltage generating portion 16a, and thereby the output of the error detecting portion 16b increases from the voltage value Vr. As a result, by the characteristic shown in the characteristic line 151, the injected current into the laser diode 11 increases.

Further, on the contrary, when the drive current of the laser diode 11 increases from the current value Ir in a stable state, its terminal voltage increases from V1. Therefore, the output of the peak detecting portion 15 takes a higher voltage value than its initial one. As a result, the output of the error detecting portion 16b takes a lower voltage value than the voltage value Vr, and thereby the injected current into the laser diode 11 decreases.

In this way, in the circuit structure according to the first embodiment, it can be seen that the terminal voltage of the laser diode 11 is controlled so as to always follow the output of the reference voltage generating portion 16a, and the amount of the drive current of the laser diode 11 is determined accordingly.

Therefore, the light output of the laser diode 11 can be made constant by setting the output of the reference voltage generating portion 16a equal to the output of the peak detecting portion 15 which is determined on the basis of the terminal voltage of the laser diode 11 with light output constant.

As shown in FIG. 7, the reference voltage generating portion 16a includes three voltage sources 70 to 72, and is structured so as to be used by switching these three voltage sources 70 to 72 in accordance with the ranges of the ambient temperature detected by the temperature detecting portion 74.

First, in the low temperature range, the voltage source for the low temperature range 70 is selected for use by the analog switch 73. As shown in FIG. 6, the terminal voltage of the laser diode 11 with respect to temperature changes with light output constant increases as the temperature falls. As shown in FIG. 8, the voltage source for the low temperature range 70 is formed by using the thermistor 81 whose resistance value increases as the temperature falls. Therefore, the output voltage characteristic of the voltage source for the low temperature range 70 is, as shown in FIG. 9 as the characteristic curve 91, closely analogous to the terminal voltage characteristic 61 of the laser diode 11 with its light output constant in the low temperature range. In this case, a light emitting device drive circuit capable of making light output in the low temperature range approximately constant can be obtained.

Next, in the room temperature range, the voltage source for room temperature 71 is selected for use by the analog switch 73. As shown in FIG. 6, the terminal voltage of the laser diode 11 with respect to temperature changes with light output constant is at an approximately flat state in the room temperature range. As shown in FIG. 10, the voltage source for room temperature 71 is formed as a constant voltage source using fixed resistors 101 and 102. Therefore, the output voltage characteristic of the voltage source for room temperature 71 is, as shown in FIG. 11 as the characteristic curve 111, closely analogous to the terminal voltage characteristic 61 of the laser diode 11 with its light output constant in the room temperature range. In this case, a light emitting device drive circuit capable of making light output in the room temperature range approximately constant can be obtained.

Next, in the high temperature range, the voltage source for the high temperature range 72 is selected for use by the analog switch 73. As shown in FIG. 6, the terminal voltage of the laser diode 11 with respect to temperature changes with light output constant increases as the temperature rises. As shown in FIG. 12, the voltage source for the high temperature range 72 is formed by using the positive characteristic thermistor 121 whose resistance value increases as the temperature rises. Therefore, the output voltage characteristic of the voltage source for the high temperature range 72 is, as shown in FIG. 13 as the characteristic curve 131, closely analogous to the terminal voltage characteristic 61 of the laser diode 11 with its light output constant in the high temperature range. In this case, a light emitting device drive circuit capable of making light output in the high temperature range approximately constant can be obtained.

As described above, according to the first embodiment, it is possible to realize a light emitting device drive circuit which makes light output approximately constant over a wide range of temperatures from the low temperature range to the high temperature range. When the light output is taken as constant, the characteristic of the terminal voltage of the laser diode 11 with respect to temperature changes varies according to the internal structure and the composition of the laser diode 11. Therefore, it is preferred that a measurement should be carried out for each type of the laser diode 11 to be controlled for examining its characteristic. Further, although the reference voltage generating portion 16a in the above first embodiment is adapted to switch to output the reference voltage generated by the voltage source for the low temperature range 70, the voltage source for room temperature 71, and the voltage source for the high temperature range 72, when the laser diode 11 is used in a relatively stable temperature environment, only any one of the voltage sources may be used.

Next, described below is a preferred setting example of a charge/discharge time constant of the capacitor for holding voltage 33 in the peak detecting portion 15.

Figure 17:
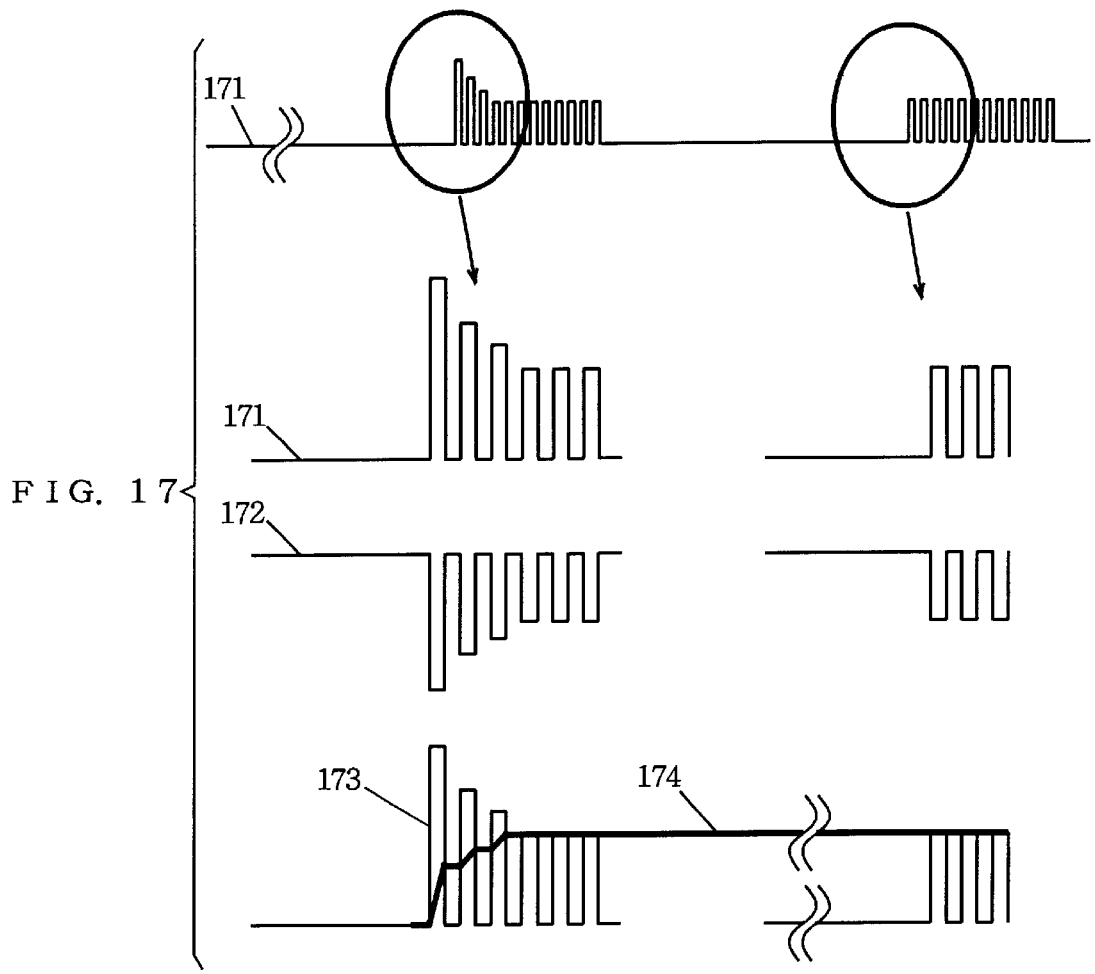
FIG. 17 is waveform diagrams showing a relation between light output and a terminal voltage of the laser diode, and an output of the peak detecting portion at the time of transmitting a burst signal.

FIG. 17 shows waveform diagrams of a relation between light output and terminal the voltage of the laser diode 11 and an output of the peak detecting portion 15 at the time of transmitting a burst signal. In FIG. 17, a waveform 171 indicates the light output of the laser diode 11, a waveform 172 indicates the terminal voltage of the laser diode 11, a waveform 173 indicates the terminal voltage with its phases reversed by the voltage detecting portion 14, and a waveform 174 indicates an output of the peak detecting portion 15.

In the case where a no-signal state has continued for a relatively long period of time by the time communications start, all electron charges accumulated in the capacitor for holding voltage 33 of the peak detecting portion 15 are in a discharge state. In this state, the peak detecting portion 15 outputs the minimum value in the range to be initially outputted. The error detecting portion 16b compares the output of the reference voltage generating portion 16a with the output of the peak detecting portion 15 to determine a control signal to the variable current source 18. Since the output of the peak detecting portion 15 is the minimum value, the error detecting portion 16b operates so as to maximize the drive current of the laser diode 11. Therefore, at the head bit of the burst signal, as shown in the waveform 171, the light output of the laser diode 11 becomes larger with respect to the output level to be set. In accordance with this light output, the terminal voltage 172 of the laser diode 11 becomes large in amplitude. Further as shown in the waveform 173, output of the voltage detecting portion 14 becomes large in amplitude at its head bit. Here, a charge time constant of the capacitor for holding voltage 33 in the peak detecting portion 15 is set to approximately a preamble period of several bits provided at the head of the burst signal. That is, the peak detecting portion 15 continues to charge in the first several bit period of the burst signal. Then, in the example of this drawing, stable output can be obtained from the peak detecting portion 15 after 8 bits. In accordance with the charge in the peak detecting portion 15, also as to the light output 171, stable output can be obtained after 8 bits.

Next, when communications start, burst signal transmissions occur periodically. Compared to this period, the discharge time constant of the capacitor for holding voltage 33 in the peak detecting portion 15 is set to be sufficiently large. When the discharge time constant is set to be large as such, the value of the voltage once held in the capacitor 33 is also held in a period of the following burst signal. Therefore, also in the head portion of the burst signal which appears periodically, stable light output can be obtained from the first bit.

As described above, according to the first embodiment, it is possible to keep light output constant over a wide range of temperatures without using a photodiode for monitoring, thereby allowing cost reduction and downsizing of an optical module. Further, the reference voltage generating portion 16a is constructed in accordance with the characteristic of the laser diode 11 to be controlled, that is, the characteristic of the terminal voltage with respect to temperature changes with light output constant, and thereby when a type of the laser diode 11 is different and thus when its characteristic is different, it is possible to generate a reference voltage accordingly, and thus to realize a light emitting device drive circuit which is ready for general purpose use.

(Second Embodiment)

Figure 18:
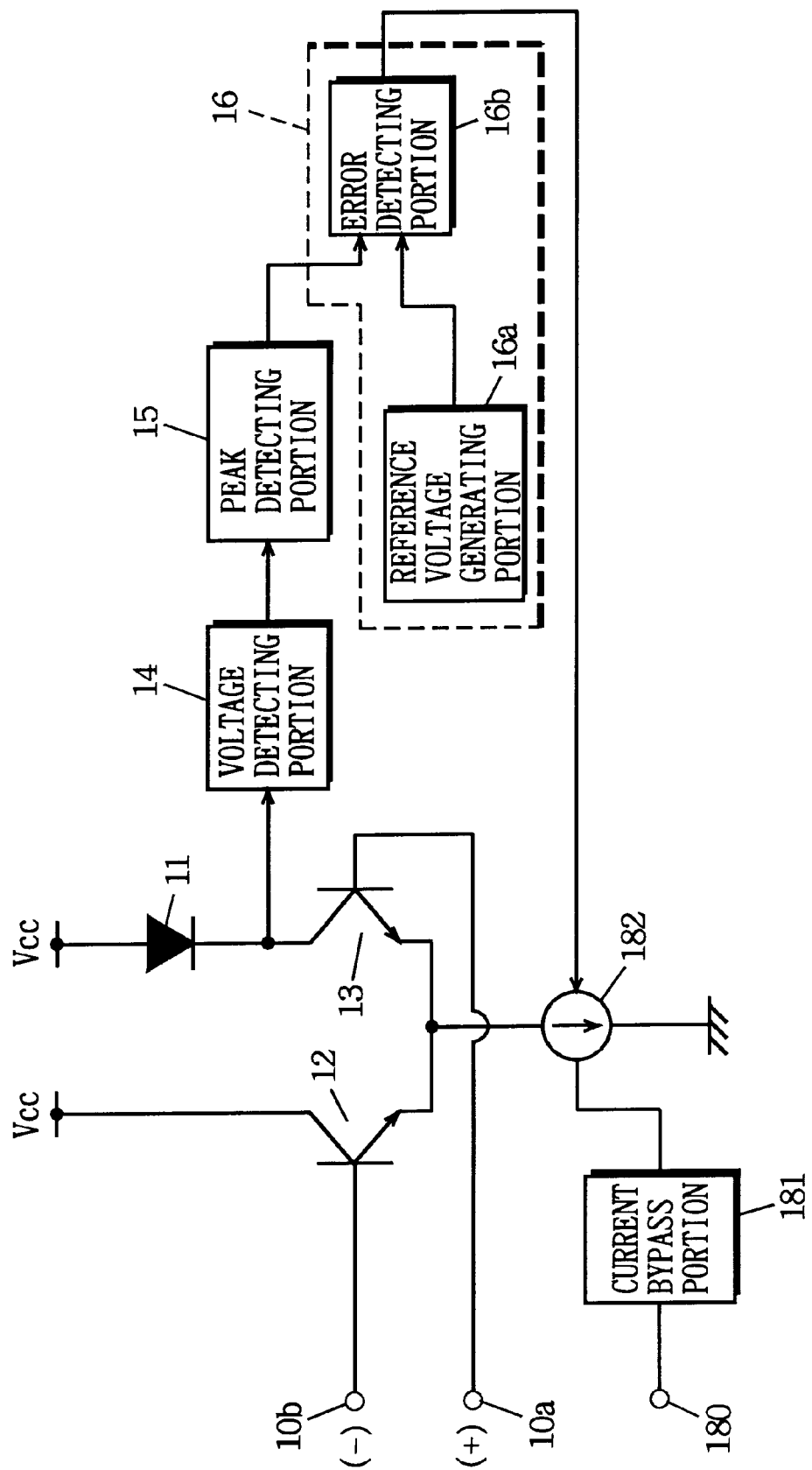
FIG. 18 is a circuit block diagram showing the structure of a light emitting device drive circuit according to a second embodiment of the present invention.

FIG. 18 is a circuit diagram showing the structure of a light emitting device drive circuit according to a second embodiment of the present invention. In FIG. 18, the light emitting device drive circuit of the present embodiment has the same structure as that of the light emitting device drive circuit in FIG. 1 except the following points, and the same reference numbers are given to the corresponding portions and their description is omitted. The present embodiment is different from the light emitting device drive circuit in FIG. 1 in that a burst control input terminal 180 and a current bypass portion 181 are newly added and that a variable current source 182 is provided instead of the variable current source 18 in FIG. 1.

The current bypass portion 181 controls the variable current source 182 so as to decrease a current applied to the laser diode 11 during a no-input period of the burst signal. The variable current source 182 changes the drive current value in collaboration with the current bypass portion 181 according to the presence or absence of the burst signal.

Figure 19:
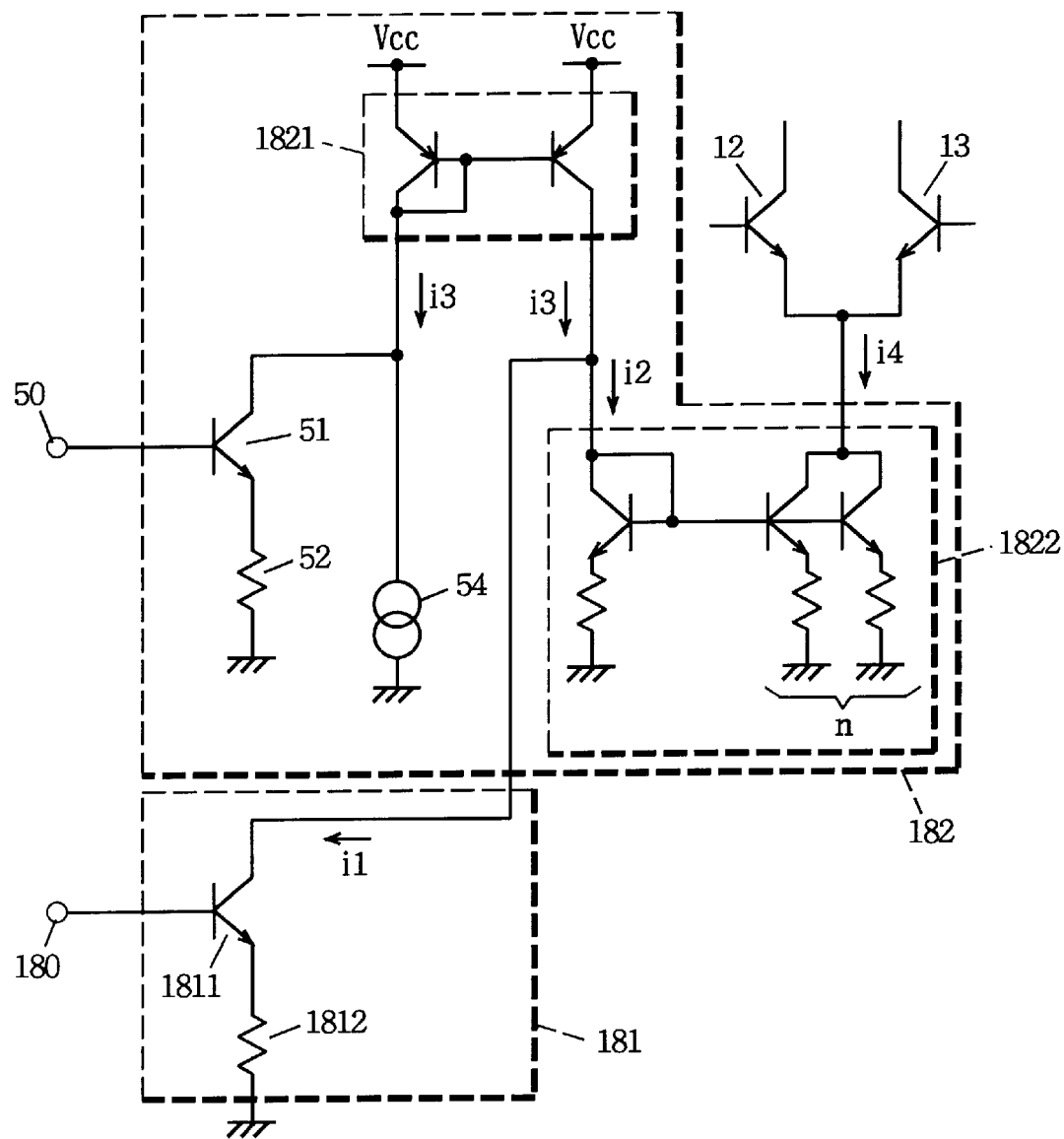
FIG. 19 is a circuit diagram showing an example of internal structure of a current bypass portion and a variable current source shown in FIG. 18.

FIG. 19. is a circuit diagram showing an example of internal structure of the current bypass portion 181 and the variable current source 182 shown in FIG. 18. In FIG. 19, the current bypass portion 181 includes a transistor 1811 and a resistor 1812. Connected to a base of the transistor 1811 is a burst control input terminal 180. An emitter of the transistor 1811 is grounded through the resistor 1812. The variable current source 182 includes a transistor 51, a resistor 52, a constant current source 54, and first and second current mirror circuits 1821 and 1822. Given to the control input terminal 50 is an output of the error detecting portion 16b as a control voltage. The control input terminal 50 is connected to a base of the transistor 51. An emitter of the transistor 51 is grounded through the load resistor 52. Connected to a collector of the transistor 51 is the constant current source 54. The collector of the transistor 51 is connected to an input end of the first current mirror circuit 1821. An output end of the first current mirror circuit 1821 is connected to an input end of the second current mirror circuit 1822. An output end of the second current mirror circuit 1822 is connected to each emitter of the transistors 12 and 13. The second current mirror circuit 1822 is structured so that n transistors on the laser diode drive side are parallel-connected.

Figure 20:
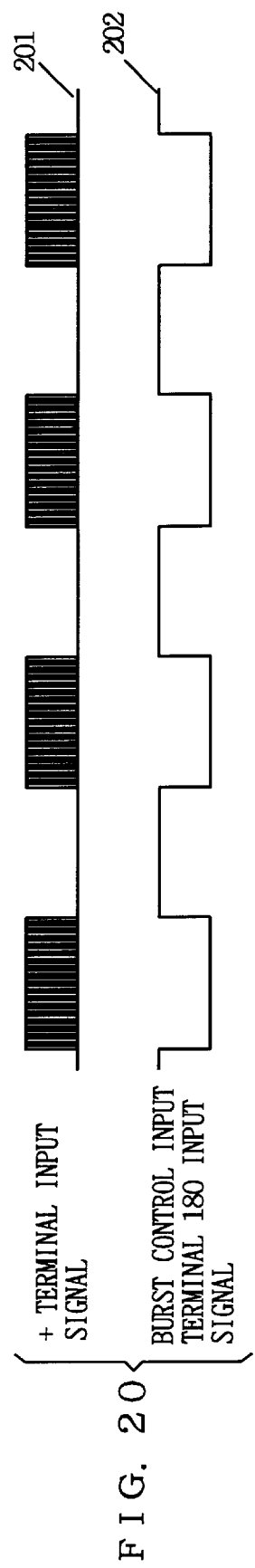
FIG. 20 shows waveform diagrams of an input signal to the + side of a differential input terminal and a signal applied to a burst control input terminal.

FIG. 20 shows an input signal 201 to the differential input terminal 10a on the + side and a signal 202 which is applied to the burst control input terminal 180. The signal 202 which is applied to the burst control input terminal 180 is a signal which becomes at a low level when a burst signal is inputted, while at a high level when a burst signal is not inputted.

Operation of the second embodiment is described below. Supplied to the control input terminal 50 of the variable current source 182 is a control signal which is determined by the principle described in the first embodiment. By this input, a current i3 flows in the first current mirror circuit 1821.

When a burst signal which intermittently occurs is inputted, the signal 202 which is applied to the burst control input terminal 180 becomes at a low level. In this case, at the current bypass portion 181, the transistor 1811 becomes in the off state and the current does not flow. That is, an amount of current i1 flowing in the current bypass portion 181 becomes 0. A current i2 flowing into the second current mirror circuit 1822 takes a value obtained by subtracting the current i1 bypassed by the current bypass portion 181 from a current i3 flowing out from the first current mirror circuit 1821. In this case, since i1=0, the current i2 is equal to the current i3. Then, a current i4 obtained by multiplying the current i2 by n times flows in the laser diode 11.

That is, with respect to the current value i3 determined by the control signal given to the control input terminal 50 of the variable current source 182, the current i4 in the laser diode 11 satisfies the relation in the following equation (3).

$$i4 = n \cdot i3 \qquad (3)$$

Next, when no burst signal is inputted, applied to the burst control input terminal 180 is the signal 202 at a high level. In this case, the high level signal is applied to the base terminal of the transistor 1811 in the current bypass portion 181, and thereby the current i1 flows in the current bypass portion 181. Since the current i3 flowing from the first current mirror 1821 is constant, i2 is a current whose value is obtained by subtracting i1 from i3. The current i4 flowing in the laser diode 11 takes a value obtained by multiplying the current i2 by n times, and therefore the current i4 takes a value shown in the following equation (4).

$$i4 = n \cdot (i3 - i1) \qquad (4)$$

Here, when the current i1 and the current i3 are set to take approximately the same current value, the value of the current i4 is approximately 0, allowing a reduction in the amount of currents as a drive circuit of light emitting devices. In order to enable a high speed response from the first bit of the burst signal, it is preferable to flow a little amount of current as the current i4. Therefore, it is preferable to set the current i3 a little larger than the current i1.

Further, it is also possible to deal with a case where a large amount of current is required as the drive current of the laser diode 11 by setting the above described n large.

When no burst signal is inputted, it is required to set the discharge time constant of the peak detecting portion 15 sufficiently large so that the control signal from the error detecting portion 16b may not change.

As described above, according to the second embodiment, a drive current is applied to the laser diode 11 only during a period when a burst signal is inputted, while current bypass is performed during a no-input period of the burst signal, thereby allowing a reduction in its power consumption. Further, it is possible to reduce the current value without using an analog switch for switching, thereby allowing a high speed response from the head of the burst signal.

(Third Embodiment)

Figure 21:
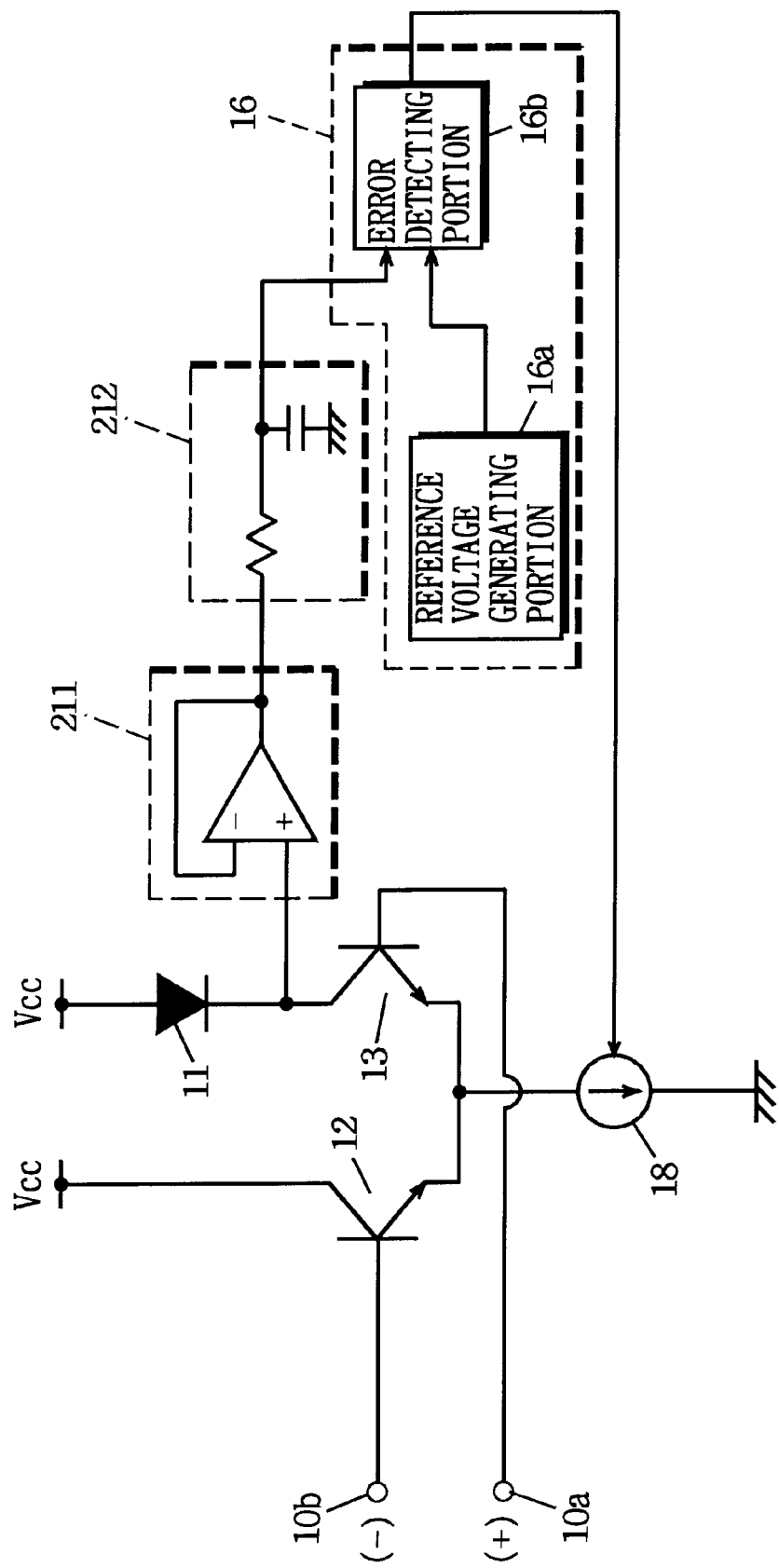
FIG. 21 is a circuit block diagram showing the structure of a light emitting device drive circuit according to a third embodiment of the present invention.

FIG. 21 is a circuit block diagram showing the structure of a light emitting device drive circuit according to a third embodiment of the present embodiment. In FIG. 21, the structure of the present embodiment is equal to that of the first embodiment shown in FIG. 1 except the following points, and the same reference numbers are given to the corresponding portions and their description is omitted. The present embodiment is different from the first embodiment in that instead of the voltage detecting portion 14 and the peak detecting portion 15 in FIG. 1, a voltage detecting portion 211 and a mean value detecting portion 212 are provided. The voltage detecting portion 211 is formed of an operational amplifier. The mean value detecting portion 212 is formed of a low pass filter. The voltage detecting portion 211, whose input end is connected to a cathode of the laser diode 11, detects a voltage of the cathode terminal of the laser diode 11. The mean value detecting portion 212, whose input end is connected to an output end of the voltage detecting portion 211, outputs a mean value of output of the voltage detecting portion 211. It is assumed that a cut-off frequency of the low pass filter which forms the mean value detecting portion 212 is set sufficiently low, compared to a frequency component of a bit stream to be transmitted. An output end of the mean value detecting portion 212 is connected to one input end of the error detecting portion 16b.

Figure 22:
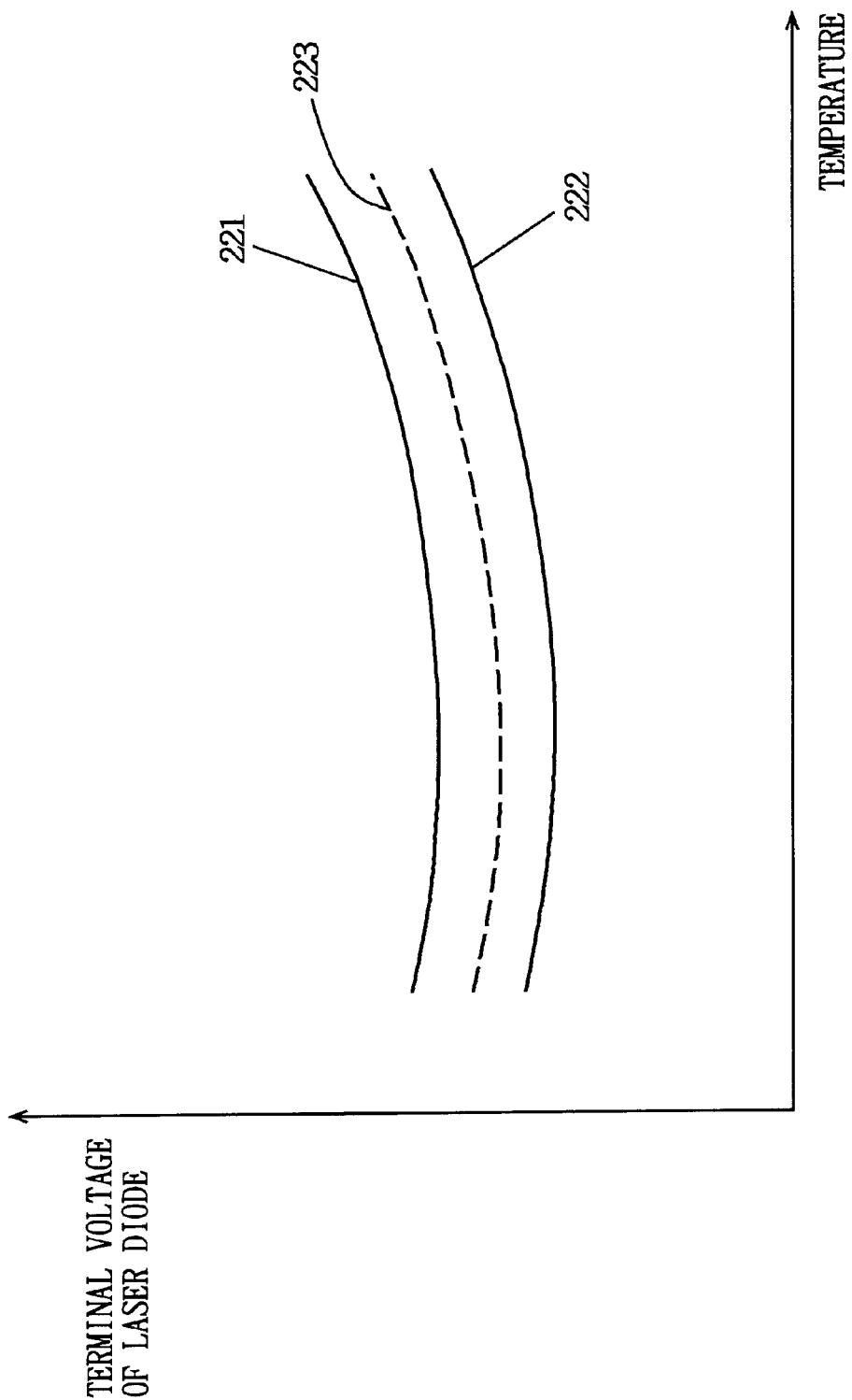
FIG. 22 is a graph describing a mean value between terminal voltage of the laser diode at the time of emitting light and a terminal voltage of the laser diode at the off state when a digital-modulated current signal is injected into the laser diode to set light output of the laser diode constant, using temperature as a parameter.

FIG. 22 is a graph describing a mean value 223 between the terminal voltage 221 of the laser diode 11 at the time of emitting light and the terminal voltage 22 of the laser diode 11 at the off state when a digital-modulated current signal is injected into the laser diode 11 to set light output of the laser diode 11 constant, using temperature as a parameter.

FIGS. 23(*a*) to 23(*c*) are diagrams showing input/output waveforms of the laser diode 11 when the digital-modulated current signal is injected into the laser diode 11. FIG. 23(*a*) indicates the injected current into the laser diode 11, FIG. 23(*b*) indicates the terminal voltage of the laser diode 11, and FIG. 23(*c*) indicates the light output of the laser diode 11.

Next, operation of the third embodiment will be described. The digital-modulated electric signal which the present embodiment handles, unlike in the first embodiment, does not take a form of a burst signal, but is inputted consecutively. When a digital-modulated current as shown in FIG. 23(*a*) is injected to the laser diode 11, its light output is such as shown in FIG. 23(*c*). In this case, as the terminal voltage of the laser diode 11, a waveform as shown in FIG. 23(*b*), which becomes at a high level when light is emitted while at a low level, can be obtained when light goes down (however, a certain voltage occurs under the influence of residual carriers).

A graph of the terminal voltage 221 when light is emitted and the terminal voltage 222 when the light is off in FIG. 22 indicates temperature change characteristics of high and low level voltages of the voltage waveform shown in FIG. 23(b) when the light output shown in FIG. 23(c) is kept constant. Then, a mean value 223 is defined as the mean value of these two characteristics. That is, it can be seen that if a mean value of the terminal voltage of the laser diode 11 can be made equal to the voltage characteristic shown by the mean value 223, light output can be made constant even with temperature changes.

In the light emitting device drive circuit shown in FIG. 21, the transistors 12 and 13 whose emitters are commonly connected switch the current according to the value of the differential input signal, and the digital-modulated current is injected into the laser diode 11. Voltage thereby occurs between the anode and cathode of the laser diode 11. The anode is connected to a power supply line and fixed voltage is applied thereto, causing the terminal voltage at the cathode side.

Connected to the cathode of the laser diode 11 is the voltage detecting portion 211 which is formed of the operational amplifier. Output of the voltage detecting portion 211 is provided for the mean value detecting portion 212 which is formed of the low pass filter. Here, the operational amplifier which forms the voltage detecting portion 211 has a characteristic that its input impedance is high and its output impedance is low. That is, the voltage detecting portion 211 detects the terminal voltage of the laser diode 11 to transmit it to the mean value detecting portion 212, and also acts as a buffer. The cathode potential of the laser diode 11 is not thereby influenced by circuit elements in the following stages of the voltage detecting portion 211. Therefore, the circuit elements in the following stages of the voltage detecting portion 211 does not interfere with high speed switching of the laser diode 11. Outputted from the mean value detecting portion 212 is a mean value of the terminal voltage of the laser diode 11.

As an output of the reference voltage generating portion 16a, a voltage corresponding to the voltage shown in the mean value 223 in FIG. 22 is generated. The error detecting portion 16b detects an error between output of the mean value detecting portion 212 and output of the reference voltage generating portion 16a and provides the result for control input of the variable current source 18, thereby controlling the set current of the variable current source 18. That is, when the output voltage of the mean value detecting portion 212 is low compared to the voltage generated by the reference voltage generating portion 16a, the set current of the variable current source 18 is controlled so as to be increased, and on the contrary, when the output voltage of the mean value detecting portion 212 is high compared to the voltage generated by the reference voltage generating portion 16a, the set current of the variable current source 18 is controlled so as to be decreased. This allows light output from the laser diode 11 to be always kept constant even with temperature changes.

In the above described first to third embodiments, although a laser diode is used as a light emitting device, another light emitting device may be used instead. As another light emitting device, for example, when an LED is used, although the switching speed is low compared to a laser diode, installation costs can be reduced.

While the invention has been described in detail, the foregoing description is in all aspects illustrative and not restrictive. It is understood that numerous other modifications and variations can be devised without departing from the scope of the invention.

What is claimed is:

1. A light emitting device drive circuit for stably driving a light emitting device which performs switching operations in response to a digital-modulated electric signal, said light emitting device drive circuit comprising:

a voltage detecting portion operable to detect a terminal voltage of the light emitting device;

a peak detecting portion operable to detect a peak value of an output of said voltage detecting portion;

a reference voltage generating portion comprising a plurality of reference voltage generating sources which generate a plurality of reference voltages, respectively, wherein said reference voltage generating portion switches to output the reference voltage generated by each of said plurality of reference voltage generating sources in accordance with ambient temperature changes; and an error detecting portion operable to detect an error between the reference voltage generated by said reference voltage generating portion and an output of said peak detecting portion, wherein the drive current of the light emitting device is controlled in accordance with an output signal of said error detecting portion;

wherein said reference voltage generating sources respectively generate reference voltages which follow changes of the terminal voltage of the light emitting device with respect to temperature changes in a unique temperature range.

2. A light emitting device drive circuit for stably driving a light emitting device which performs switching operations in response to a digital-modulated electric signal, wherein the digital-modulated electric signal is inputted in a form of a burst signal, and a control signal is provided for notifying a presence or absence of the burst signal, said light emitting device drive circuit comprising:

a voltage detecting portion operable to detect a terminal voltage of the light emitting device;

a peak detecting portion operable to detect a peak value of an output of said voltage detecting portion;

a reference voltage generating portion operable to generate a reference voltage;

an error detecting portion operable to detect an error between the reference voltage generated by said reference voltage generating portion and an output of said peak detecting portion, wherein the drive current of the light emitting device is controlled in accordance with an output signal of said error detecting portion; and a current bypass portion operable to bypass a portion of drive current of the light emitting device to decrease the drive current when notified by the control signal of the absence of the burst signal.

3. A light emitting device drive circuit for stably driving a light emitting device which performs switching operations in response to a digital-modulated electric signal, wherein the digital-modulated electric signal is inputted in a form of a burst signal, said light emitting device drive circuit comprising:

a voltage detecting portion operable to detect a terminal voltage of the light emitting device;

a peak detecting portion operable to detect a peak value of an output of said voltage detecting portion, wherein a charge time constant of said peak detecting portion is set within a first several bit period of the burst signal; and a current control portion operable to control a drive current of the light emitting device in accordance with an output of said peak detecting portion.

4. A light emitting device as claimed in claim 3, wherein a discharge time constant of said peak detecting portion is set to be a value sufficiently larger than a no-signal period of the burst signal.

5. A light emitting device drive circuit for stably driving a light emitting device which performs switching operations in response to a digital-modulated electric signal, said light emitting device drive circuit comprising:
- a voltage detecting portion operable to detect a terminal voltage of the light emitting device;
- a peak detecting portion operable to detect a peak value the terminal voltage detected by said voltage detecting portion;
- a reference voltage generating portion operable to generate a reference voltage; and
- a current control portion operable to control a drive current of the light emitting device, and operable to detect an error between the reference voltage generated by said reference voltage generating portion and the peak value detected by said peak detecting portion to control the drive current of the light emitting device so that the terminal voltage of the light emitting device follows the reference voltage according to the detected error.

6. A light emitting device drive circuit as claimed in claim 5, wherein said reference voltage generating portion is operable to generate a reference voltage which follows changes of the terminal voltage of the light emitting device with respect to temperature changes under conditions that light outputted from the light emitting device is kept constant.

7. A light emitting device drive circuit as claimed in claim 5, wherein said current control portion further comprises a current bypass portion operable to bypass a portion of drive current of the light emitting device to decrease the drive current.

8. A light emitting device drive circuit for stably driving a light emitting device which performs switching operations in response to a digital-modulated electric signal, said light emitting device drive circuit comprising:
- a voltage detecting portion operable to detect a terminal voltage of the light emitting device;
- a parameter detecting portion operable to detect a prescribed parameter in a waveform of the terminal voltage detected by said voltage detecting portion;
- a reference voltage generating portion operable to generate a reference voltage; and
- a current control portion operable to control a drive current of the light emitting device, and operable to detect an error between the reference voltage generated by said reference voltage generating portion and the parameter detected by said parameter detecting portion to control the drive current of the light emitting device so that the terminal voltage of the light emitting device follows the reference voltage according to the detected error.

* * * * *